US011230048B2

(12) United States Patent
Totsuka et al.

(10) Patent No.: US 11,230,048 B2
(45) Date of Patent: Jan. 25, 2022

(54) MANDREL FOR MANUFACTURING FIBER REINFORCED RESIN VESSEL

(71) Applicants: HONDA MOTOR CO., LTD., Tokyo (JP); DAIHO INDUSTRIAL CO., LTD., Moriguchi (JP)

(72) Inventors: Masanori Totsuka, Wako (JP); Koei Fujiki, Wako (JP); Yohei Noji, Wako (JP); Yoshikazu Shinnabe, Wako (JP); Keisuke Matsuzaka, Tottori (JP)

(73) Assignee: HONDA MOTOR CO., LTD., Tokyo (JP)

( * ) Notice: Subject to any disclaimer, the term of this patent is extended or adjusted under 35 U.S.C. 154(b) by 184 days.

(21) Appl. No.: 16/747,722

(22) Filed: Jan. 21, 2020

(65) Prior Publication Data

US 2020/0230867 A1    Jul. 23, 2020

(30) Foreign Application Priority Data

Jan. 21, 2019    (JP) .............................. JP2019007478

(51) Int. Cl.
  *B29C 53/82*    (2006.01)
  *B29L 31/00*    (2006.01)
  *B29C 70/32*    (2006.01)

(52) U.S. Cl.
  CPC ............ *B29C 53/825* (2013.01); *B29C 70/32* (2013.01); *B29L 2031/7172* (2013.01); *F17C 2209/2163* (2013.01)

(58) Field of Classification Search
  CPC ........... F17C 2209/2163; B29C 53/822; B29C 70/32; B29C 53/82; B29C 53/821; B29C 53/825
  See application file for complete search history.

(56) References Cited

U.S. PATENT DOCUMENTS

| 3,508,677 A | * | 4/1970 | Laibson | .............. B29C 66/7392 |
| | | | | 220/590 |
| 5,849,155 A | * | 12/1998 | Gasland | ................. D21H 17/28 |
| | | | | 162/158 |
| 9,492,878 B2 | * | 11/2016 | Claudel | ..................... F17C 1/06 |

FOREIGN PATENT DOCUMENTS

| CN | 203765865 U | 8/2014 |
| CN | 104354436 A | 2/2015 |
| CN | 204398344 U | 6/2015 |
| CN | 104772909 A | 7/2015 |
| CN | 107008866 A | 8/2017 |
| CN | 107405841 A | 11/2017 |
| CN | 108621447 A | 10/2018 |
| CN | 108864995 A | 11/2018 |
| JP | S4520792 Y1 | 8/1970 |
| JP | S51148478 U | 11/1976 |

(Continued)

OTHER PUBLICATIONS

JPO Notice of Reasons for Refusal for Japanese Patent Application No. 2019-007478 dated Sep. 15, 2020; 8 pp.

(Continued)

*Primary Examiner* — Carson Gross
(74) *Attorney, Agent, or Firm* — Armstrong Teasdale LLP

(57) ABSTRACT

A mandrel for manufacturing a fiber reinforced resin vessel by a filament winding process includes: a tubular part; and a pair of end parts joined to respective axial ends of the tubular part. The tubular part and the end parts are each made of a molded product of a material including pulp and a starch-based binder.

11 Claims, 12 Drawing Sheets

(56) References Cited

FOREIGN PATENT DOCUMENTS

| | | |
|---|---|---|
| JP | S61254309 A | 11/1986 |
| JP | H09323365 A | 12/1997 |
| JP | 2000108210 A * | 4/2000 |
| JP | 2000108210 A | 4/2000 |
| JP | 2008213389 A | 9/2008 |
| JP | 5082510 B2 | 11/2012 |
| JP | 2017122464 A | 7/2017 |

OTHER PUBLICATIONS

First Notification of Office Action for Patent Application CN 202010057655.8 dated Jul. 2, 2021; 15 pp.

* cited by examiner

MANDREL FOR MANUFACTURING FIBER REINFORCED RESIN VESSEL

TECHNICAL FIELD

The present invention relates to a mandrel for forming a vessel made of fiber reinforced resin by a filament winding process.

BACKGROUND ART

Typically, a mandrel is used when forming a fiber reinforced resin vessel by using the filament winding process (see JPH09-323365A). Upon forming the vessel on the mandrel, the mandrel is required to be removed from the completed vessel without damaging the vessel. For this purpose, the mandrel may be made of a metallic alloy having a low melting point such as a tin alloy and a bismuth alloy. Alternatively, the mandrel may be made of water-soluble resin so that the mandrel may be removed by dissolving the mandrel with water.

In terms of manufacturing efficiency, the melting or dissolving of the mandrel is desired to be completed in a shortest possible time period.

SUMMARY OF THE INVENTION

In view of such a problem of the prior art, a primary object of the present invention is to provide a mandrel for manufacturing a fiber reinforced resin vessel by a filament winding process that can be removed from the completed vessel in a short period of time.

To achieve such an object, one embodiment of the present invention provides a mandrel (6) for manufacturing a fiber reinforced resin vessel (2) by a filament winding process, comprising: a tubular part (11, 12); and a pair of end parts (13, 14) joined to respective axial ends of the tubular part; wherein the tubular part and the end parts are each made of a molded product of a material including pulp and a starch-based binder.

The mandrel is thus formed as a hollow shell by combining the tubular part and the two end parts. Since the mandrel is hollow, and the wall thereof may have a small thickness, the surface area for a given mass of the mandrel can be maximized. As a result, the time period required for dissolving the mandrel with water can be minimized. The material including the pulp and the starch-based binder has a very small impact on the environment.

Preferably, the tubular part includes a cylindrical outer peripheral wall (17) having a central axial line (A), a planar partition wall (18) extending radially inward and orthogonally to the central axial line from a first end (17A) of the outer peripheral wall, and a plurality of bulging parts (19) bulging from the partition wall toward a second end (17B) of the outer peripheral wall, each bulging part being connected to an inner circumferential surface of the outer peripheral wall.

The partition wall and the bulging parts can improve the rigidity of the tubular part.

Preferably, a recess (24) is defined jointly by a back surface of each bulging part and an opposing part of the inner circumferential surface of the outer peripheral wall.

Thereby, the mass of the mandrel can be minimized so that the surface area of the mandrel can be maximized. As a result, the time period required for dissolving the mandrel with water can be minimized.

Preferably, a free end of each bulging part includes an end wall (21) extending in parallel with the partition wall and connected to the outer peripheral wall.

Thereby, the rigidity of the tubular part can be increased.

Preferably, each bulging part includes a pair of side walls (22) extending radially with respect to the central axial line.

Thereby, the rigidity of the tubular part forming the mandrel can be increased.

Preferably, a shaft hole (26, 31) is passed through the end parts and the tubular part in a coaxial relationship to receive a shaft (5) that supports the end parts and the tubular part.

Thereby, the tubular part and the end parts forming the mandrel can be supported by the shaft in a favorable manner.

Preferably, a part of an outer surface of each end part surrounding the shaft hole is formed with a receiving recess (32) configured to receive a fitting (7, 8) for the vessel.

Thereby, the fittings can be positioned relative to the mandrel in a reliable manner.

Preferably, the receiving recess is provided with a plurality of radial extensions (32B) configured to receive complementary radial projections (43) of the fitting. It is particularly preferable if each end part is provided with a plurality of reinforcing ribs (36) extending radially from a peripheral part of the shaft hole along an inner surface of the end part.

Thereby, the rigidity of the end parts forming the mandrel can be increased.

Preferably, the tubular part includes a plurality of individual tubular part sections (11, 12) that are joined to one another in a coaxial relationship, and each tubular part section is provided with a plurality of projecting pieces (28) projecting from an axial end thereof beyond a corresponding axial edge thereof, each projecting piece having an outwardly facing surface configured to contact an inner peripheral surface of the adjoining tubular part section or the adjoining end part. Also preferably, the tubular part includes a plurality of individual tubular part sections (11, 12) that are joined to one another in a coaxial relationship, and each tubular part section is provided with a plurality of locking projections (27) projecting axially from the partition wall beyond a corresponding axial edge of the tubular part section, each locking projection having an outwardly facing surface configured to contact an inner peripheral surface of the adjoining tubular part section or the adjoining end part.

Thereby, each tubular part section can be correctly positioned relative to the adjoining tubular part section or the adjoining end part in a reliable manner.

Preferably, the tubular part and the end parts consist of individual molded products formed by injection molding.

The various parts of the mandrel can be molded from a material containing pulp and a starch-based binder in a highly accurate and efficient manner.

The present invention thus provides a mandrel for manufacturing a fiber reinforced resin vessel by a filament winding process that can be removed from the completed vessel in a short period of time.

BRIEF DESCRIPTION OF THE DRAWING(S)

DESCRIPTION OF THE PREFERRED EMBODIMENT(S)

A preferred embodiment of the present invention is described in the following with reference to the appended drawings.

Figure 1:
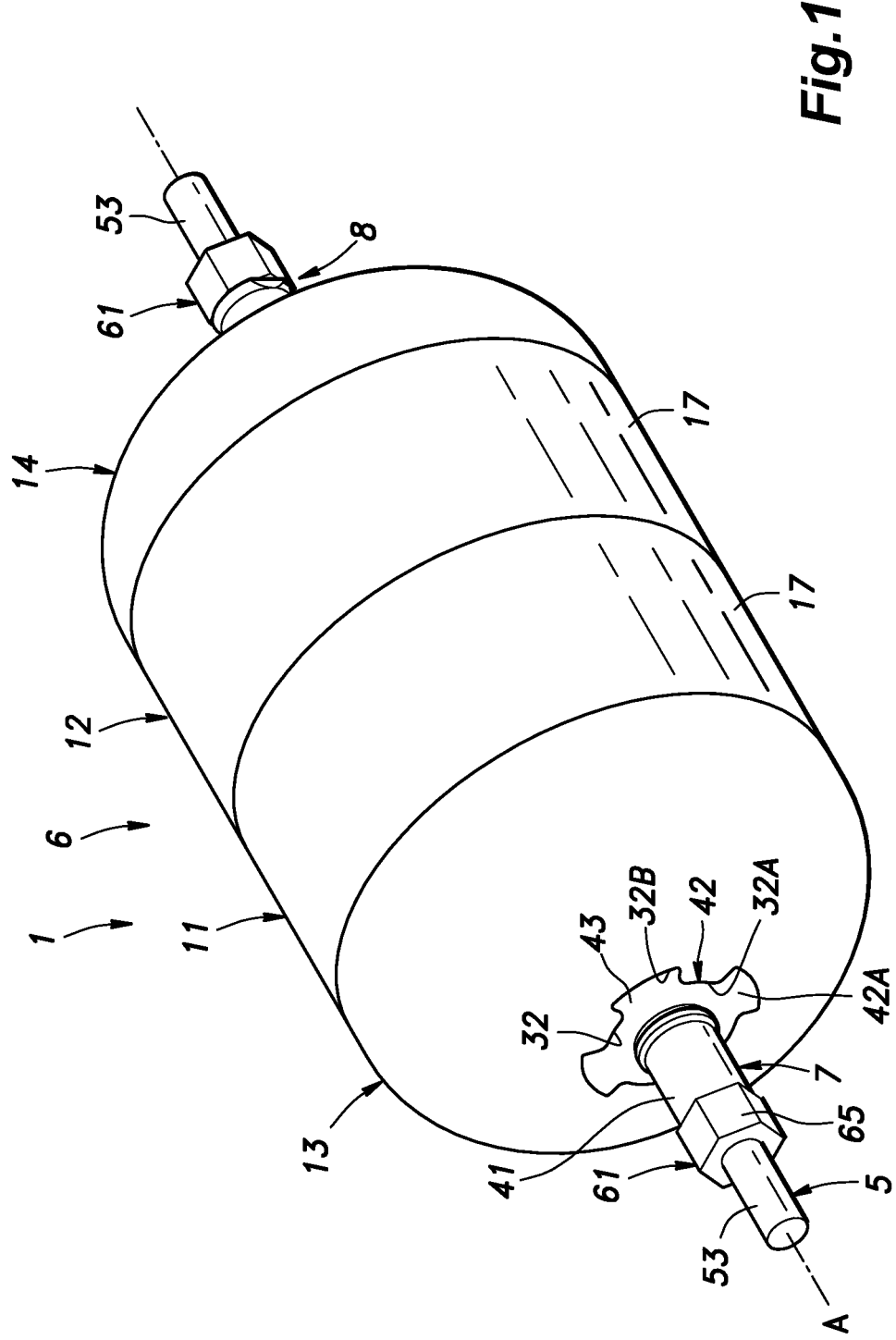
FIG. 1 is a perspective view of a mandrel structure according to an embodiment of the present invention.

FIG. 1 shows a mandrel structure according to an embodiment of the present invention which is to be used for forming a fiber reinforced resin vessel 2 (see FIG. 12) by a filament winding process. In the filament winding process, the vessel 2 is formed by winding a filament of reinforcing fibers impregnated with a thermosetting resin around the mandrel structure 1. The thermosetting resin typically includes an epoxy resin, a phenol resin, an unsaturated polyester, and so on. The reinforcing fibers may be, for example, carbon fibers, glass fibers, aramid fibers, boron fibers, or the like. The reinforcing fibers preferably consist of continuous fibers, and the fibers are aligned to form a filament. The filament of reinforcing fibers impregnated with the thermosetting resin may consist of a tow prepreg.

The vessel 2 is typically configured as a pressure vessel such as a hydrogen tank, a CNG tank, and an LPG tank for storing hydrogen gas, CNG (compressed natural gas), LPG (liquefied petroleum gas), respectively. In particular, the vessel 2 may be configured to be mounted on a motor vehicle.

Figure 2:
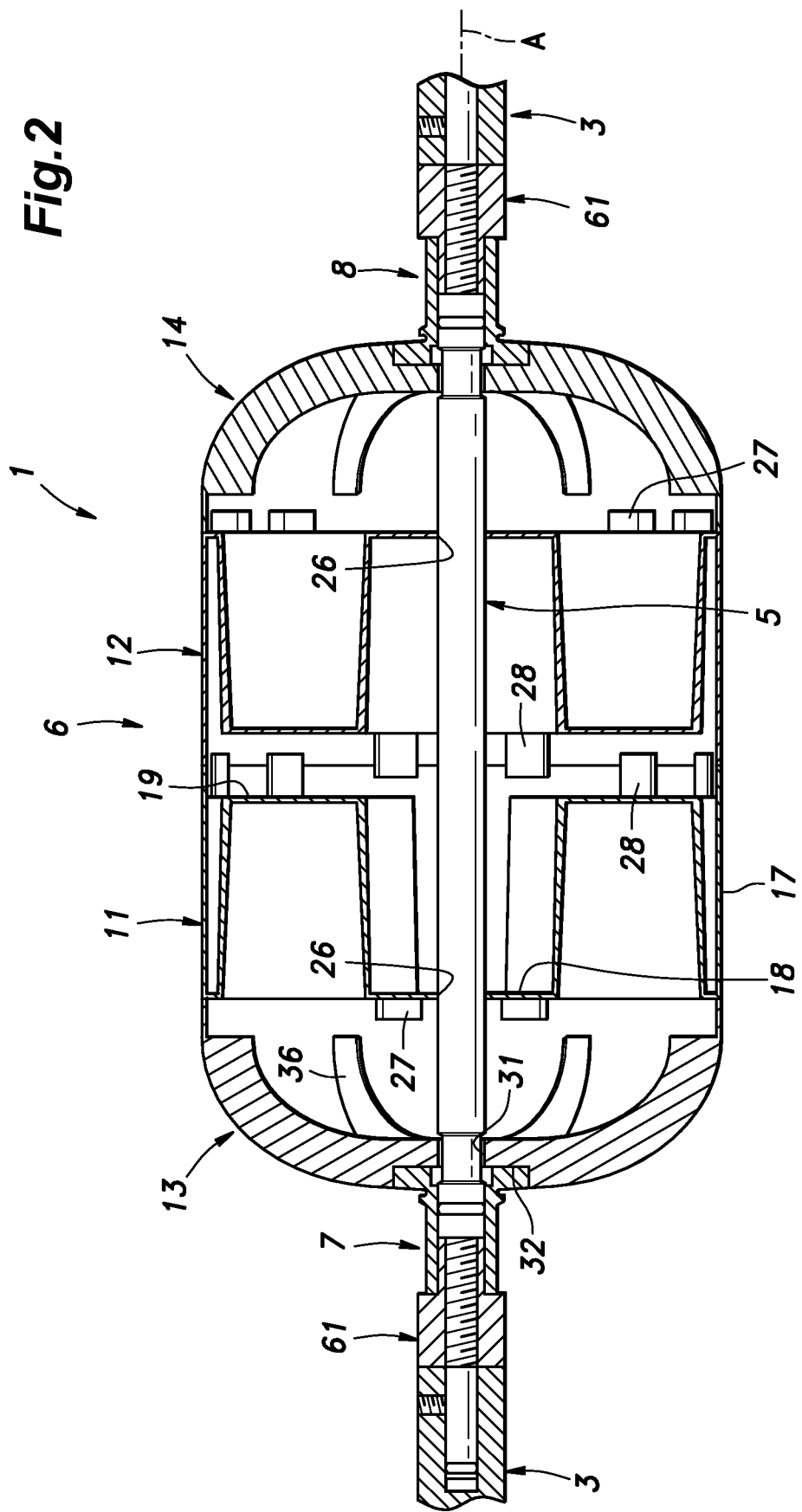
FIG. 2 is a sectional view of the mandrel structure.

As shown in FIGS. 1 and 2, the mandrel structure 1 includes a shaft 5 having both ends supported by a drive unit 3, a mandrel 6 having the shaft 5 passed therethrough, and a pair of fittings 7 and 8 provided at the respective axial ends of the mandrel 6 and having the shaft 5 passed therethrough. The fittings 7 and 8 allow a valve or a plug to be placed therein to allow access to the content of the vessel 2 or to close the vessel 2 as the case may be.

The mandrel 6 is formed by molding a material containing pulp and a starch-based binder. The pulp may be, for example, softwood pulp. The starch-based binder is preferably carboxymethyl cellulose (CMC). By dispersing the pulp and the starch-based binder in water, a viscous PIM material (pulp injection molding material) is formed. The mandrel 6 is formed by injection molding the PIM material. More specifically, the mandrel 6 is formed by injecting the PIM material under pressure into a heated mold. The molded mandrel 6 loses moisture by evaporation by receiving heat from the mold, and retains a prescribed shape. In either the PIM material or the dried mandrel 6, the weight ratio of the pulp to the total weight of the pulp and the starch-based binder is preferably between 50% and 90%.

Figure 3:
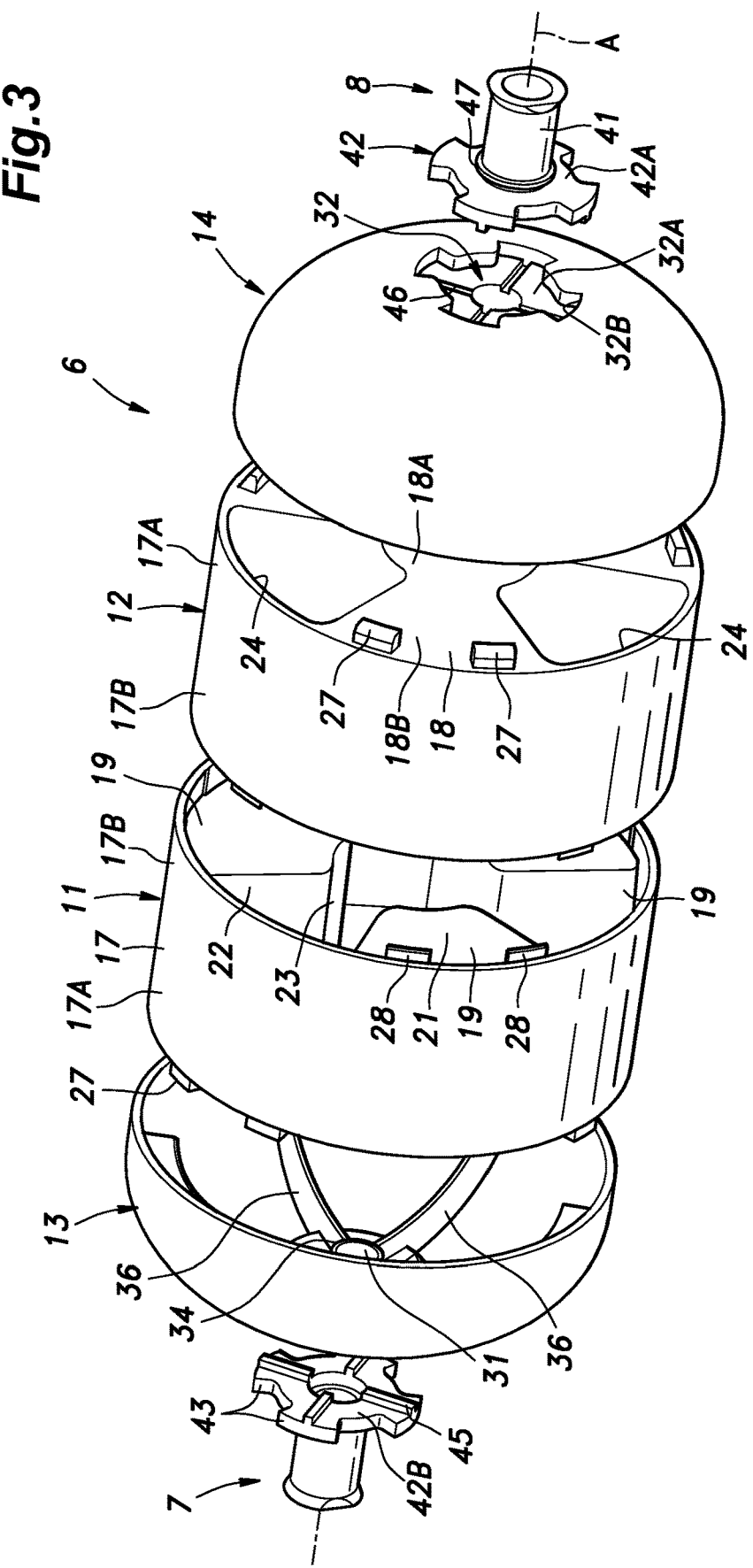
FIG. 3 is an exploded perspective view of a mandrel and a pair of fittings.
Figure 4:
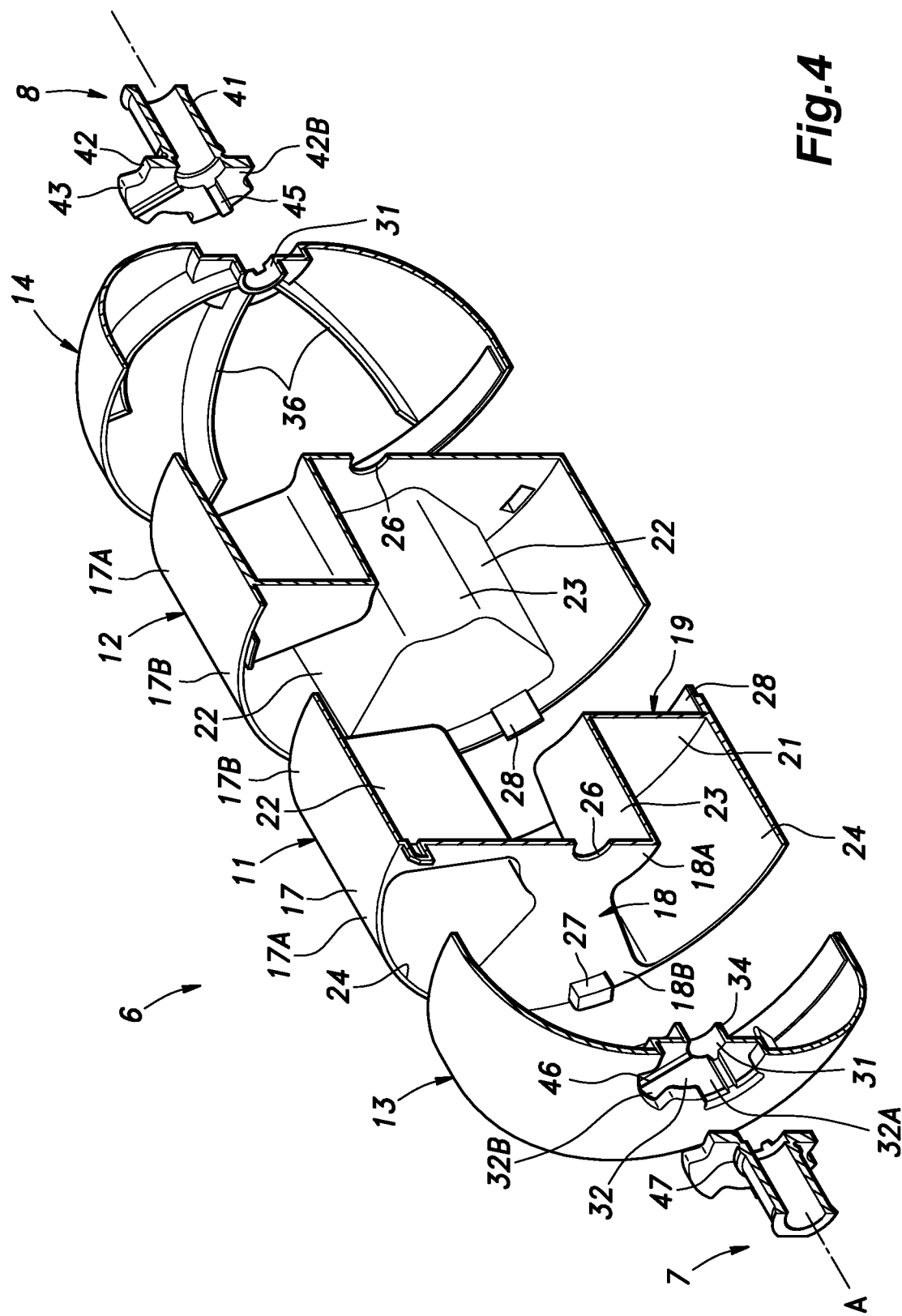
FIG. 4 is an exploded sectional perspective view of the mandrel and the fittings.
Figure 5:
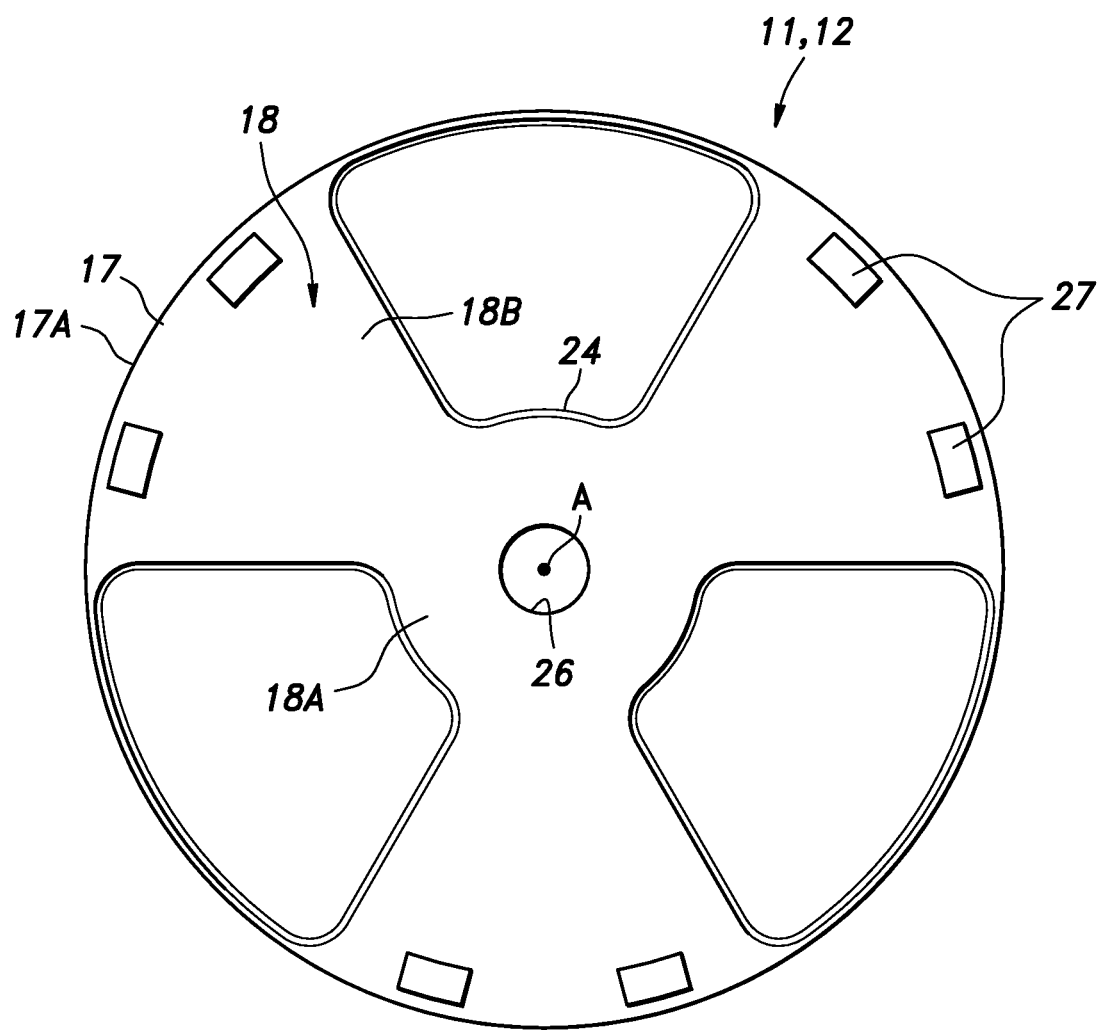
FIG. 5 is a side view of a first tubular part (a second tubular part) of the mandrel as seen from the side of a first end.
Figure 6:
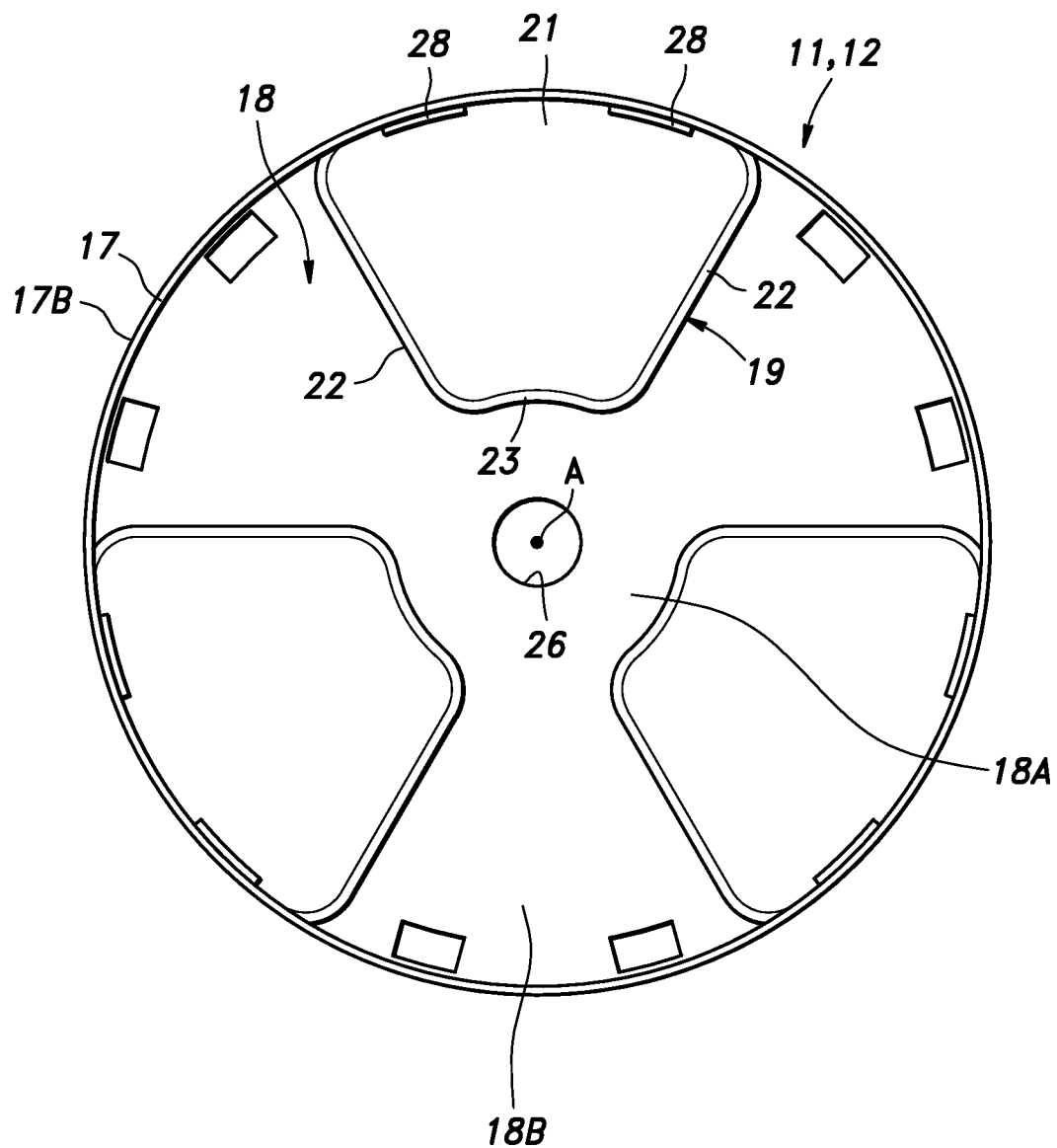
FIG. 6 is a side view of the first tubular part (the second tubular part) of the mandrel as seen from the side of a second end.
Figure 7:
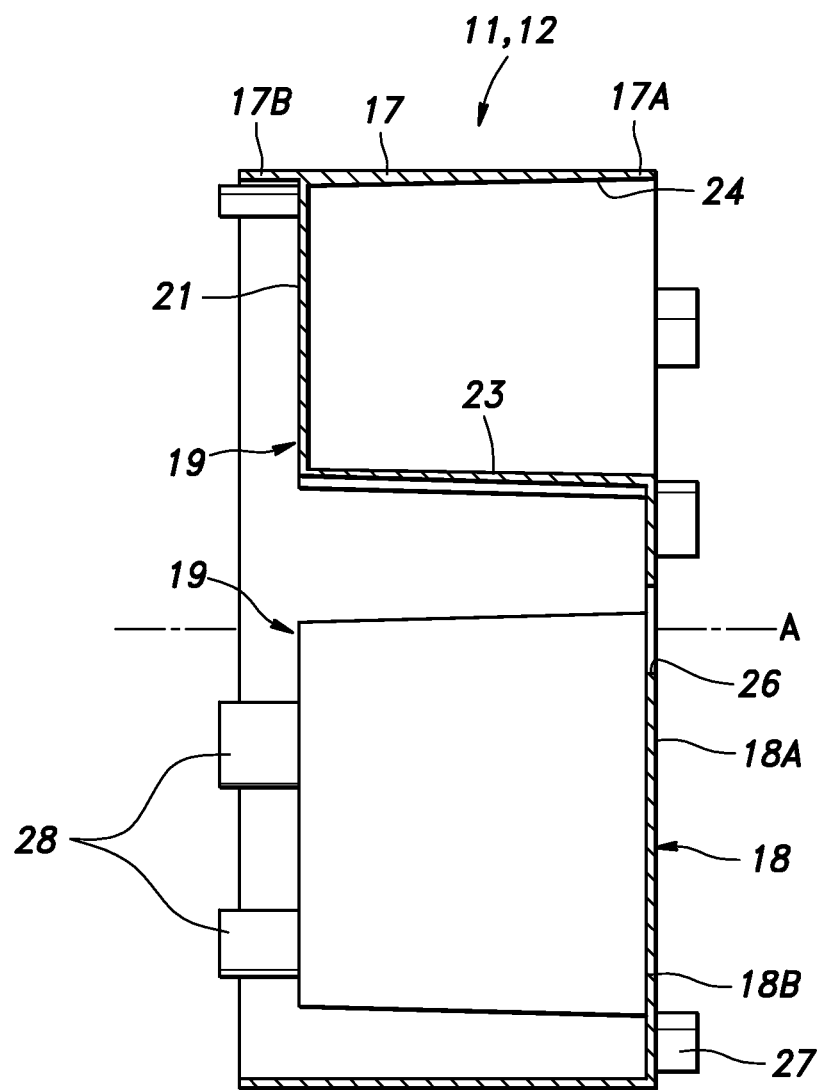
FIG. 7 is a sectional view of the first tubular part (the second tubular part) of the mandrel.

As shown in FIGS. 3 and 4, the mandrel 6 includes a pair of tubular parts 11 and 12 joined to each other along the axial direction in a coaxial relationship, and a pair of end parts 13 and 14 that are attached to the outer ends of the tubular parts 11 and 12, respectively. Alternatively, the tubular parts 11 and 12 consist of a single tubular part. The mandrel 6 has a central axial line A. The first end part 13, the first tubular part 11, the second tubular part 12, and the second end part 14 are arranged in this order along the axial line A. The first tubular part 11 and the second tubular part 12 are identical in shape, and are arrange or positioned in a mutually reversed orientation. Similarly, the first end part 13 and the second end part 14 are identical in shape, and are arrange and positioned in a mutually reversed orientation. The mandrel 6 is thus formed as a hollow and enclosed shell jointly by the first end part 13, the first tubular part 11, the second tubular part 12, and the second end part 14.

As shown in FIG. 3 to FIG. 8, the first tubular part 11 and the second tubular part 12 each include an outer peripheral wall 17 formed in a cylindrical shape centering on the axial line A, a planar partition wall 18 extending radially inward from the edge of a first end 17A of the outer peripheral wall 17 and orthogonally to the axial line A, a plurality of bulging parts 19 bulging axially from the partition wall 18 toward the second end 17B of the outer peripheral wall 17. In the present embodiment, the partition wall 18 is provided with three bulging parts 19 which are arranged at a regular angular interval, and the bulging parts 19 are identical in shape.

Each bulging part 19 has a pair of side walls 22 extending radially inward from the outer peripheral wall 17, an inner peripheral wall 23 extending between the radially inner edges of the side walls 22, and an end wall 21 extending between the axial edges of the inner peripheral wall 23 and the side walls 22 on the side of the second end 17B of the outer peripheral wall 17. The outer edge of the end wall 21 is connected to the outer peripheral wall 17. The end wall 21 is substantially orthogonal to the axial line A. The end wall 21 is positioned slightly inward of the edge of the second end 17B of the outer peripheral wall 17. The inner peripheral walls 23 of the different bulging parts 19 are located on a common cylindrical plane centered around the axial line A. Each bulging part 19 thus has a sector shape extending over an angle of about 60 degrees as seen in the axial direction.

Also, a recess 24 is jointly defined by a back surface of each bulging part 19 (more specifically, the back surfaces of the end wall 21, the side walls 22, and the inner peripheral wall 23 of each bulging part 19) and an opposing part of the inner circumferential surface of the outer peripheral wall 17. Each recess 24 faces toward the first end 17A and has a sector shape corresponding to the sector shape of the bulging part 19 as seen in the axial direction.

The partition wall 18 includes a circular partition wall center portion 18A and a plurality of partition wall extension portions 18B extending in the radial direction from the partition wall center portion 18A. The outer ends of the partition wall extension portions 18B are connected to the outer peripheral wall 17. The partition wall center portion 18A and the partition wall extension portions 18B are thus delimited by the recesses 24 and the outer peripheral wall 17. A first shaft hole 26 is passed centrally through the partition wall center portion 18A of the partition wall 18 along the axial line A.

At least one locking projection 27 protrudes from the outer surface of each partition wall extension portion 18B. In the illustrated embodiment, a pair of locking projections 27 protrude from outer peripheral parts of each partition wall extension portion 18B in the axial direction. The locking projections 27 protrude in a direction opposite to the protruding direction of the bulging parts 19. The back side of each locking projection 27 defines a recess that opens to the side of the second end 17B. On the inner peripheral surface of the second end 17B of the outer peripheral wall 17 are provided a plurality of projecting pieces 28 projecting away from the first end 17A in the axial direction slightly beyond the edge of the second end 17B of the outer peripheral wall 17. The outer surface of each projecting piece 28 is flush with the inner peripheral of the outer peripheral wall 17, and has a certain thickness in the radial direction.

Figure 8:
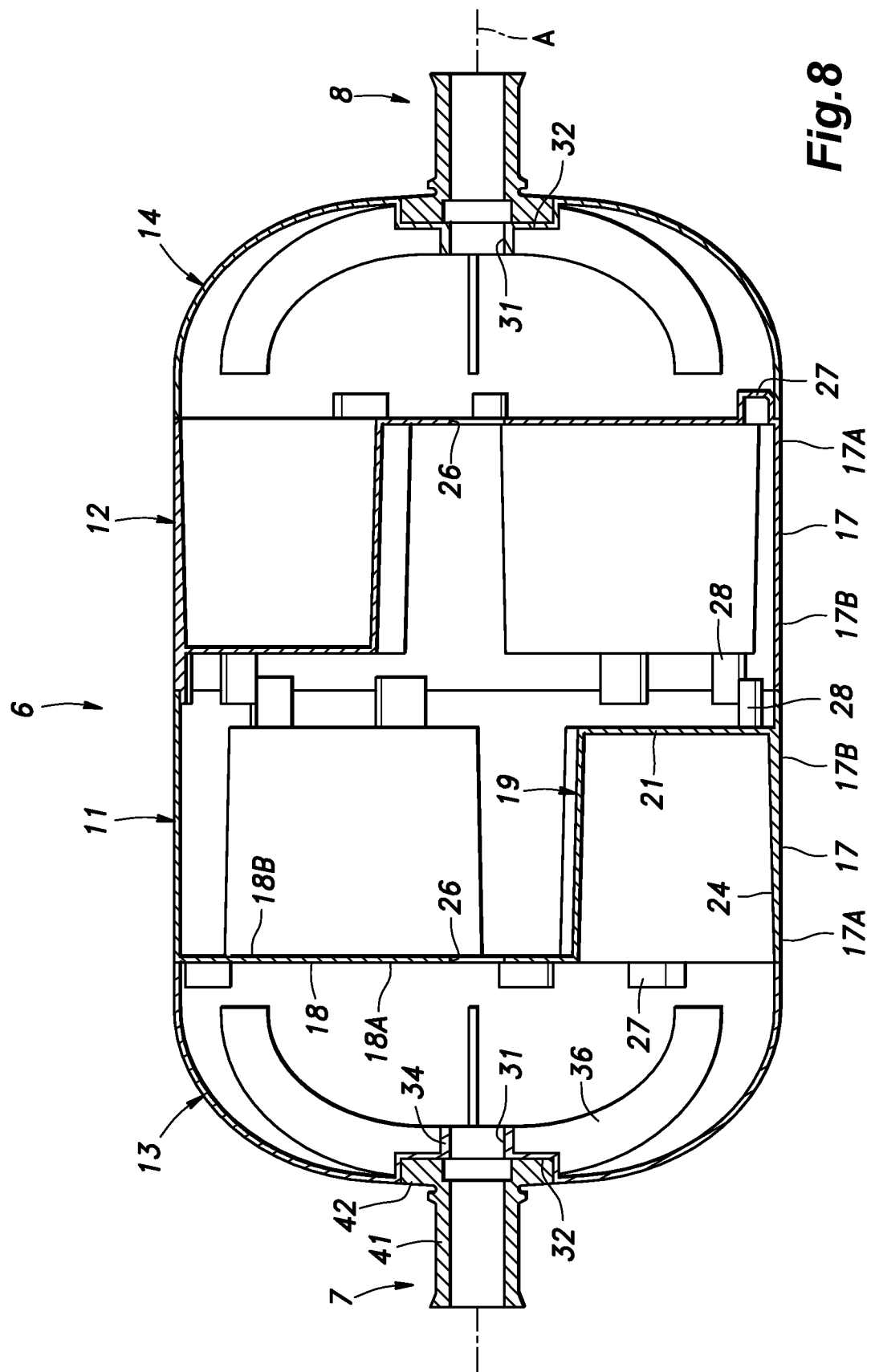
FIG. 8 is a sectional view of the mandrel and the fittings.
Figure 9:
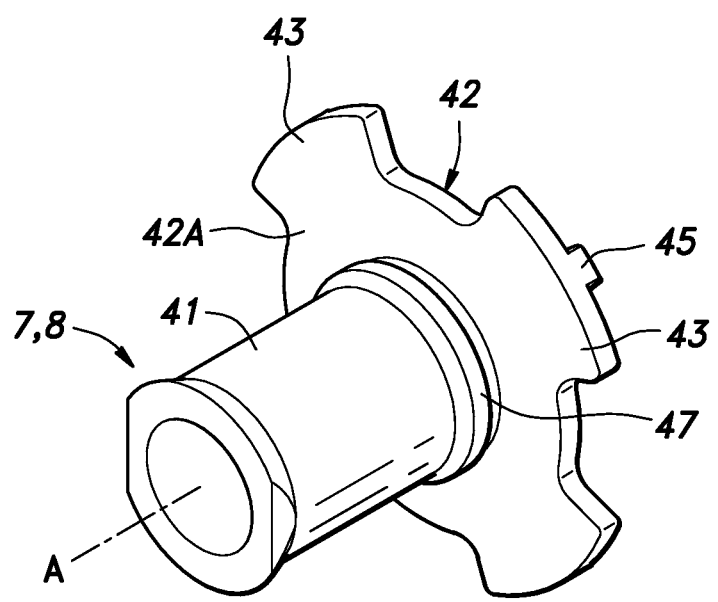
FIG. 9 is a front perspective view of the first fitting (the second fitting)
Figure 10:
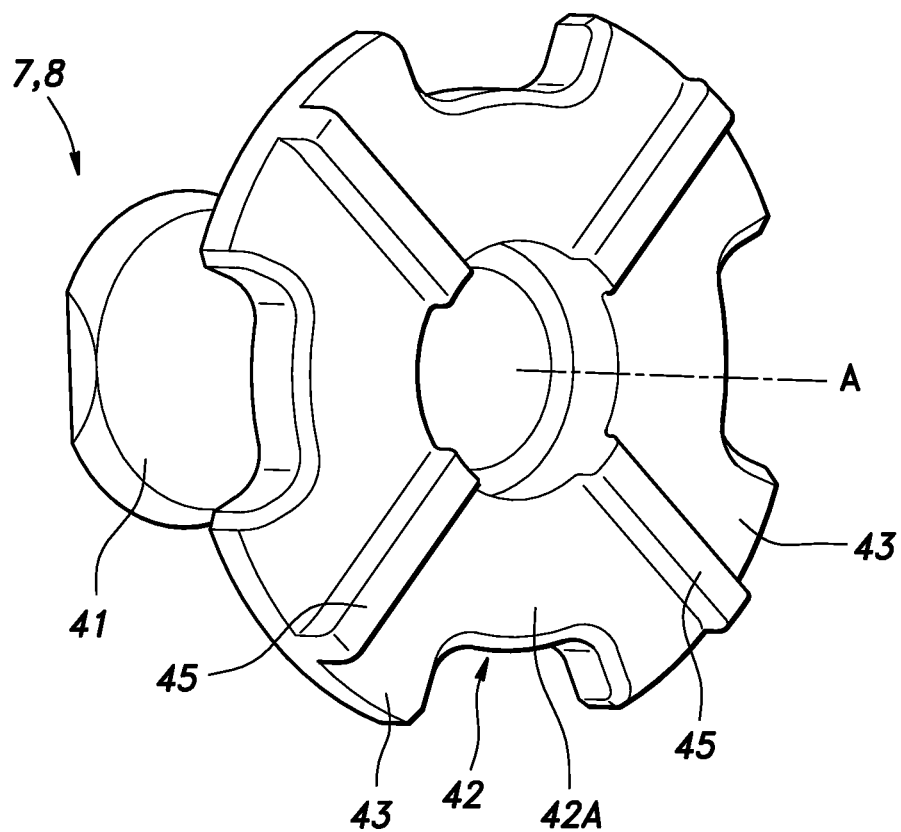
FIG. 10 is a rear perspective view of the first fitting (the second fitting)

As shown in FIG. 8, the second tubular part 12 is disposed in the reversed orientation relative to the first tubular part 11 so that the second end 17B of the first tubular part 11 abuts against the second end 17B of the second tubular part 12 in the axial direction. Each projecting piece 28 of the first tubular part 11 extends along the inner peripheral surface of the outer peripheral wall 17 of the second tubular part 12, and the outer surface of the part of the projecting piece extending beyond the second end 17B of the first tubular part 11 is in contact with the inner peripheral surface of the outer peripheral wall 17 of the second tubular part 12. Similarly, each projecting piece 28 of the second tubular part 12 extends along and in contact with the inner peripheral surface of the outer peripheral wall 17 of the first tubular part 11. As a result, the relative movement between the first tubular part 11 and the second tubular part 12 in the direction orthogonal to the axial line A is restricted. In addition, each projecting piece 28 of the first tubular part 11 is in contact with the corresponding projecting piece 28 of the second tubular part 12 in the circumferential direction so that the first tubular part 11 and the second tubular part 12 are prevented from rotating relative to each other.

As shown in FIGS. 3, 4 and 8, the first end part 13 and the second end part 14 are identical in shape, and are each formed as a semispherical shell. The outer peripheral edges of the first end part 13 and the second end part 14 are circular in shape. The outer peripheral edge of the first end part 13 abuts against the terminal edge of the first end 17A of the outer peripheral wall 17 of the first tubular part 11 in the axial direction. Each locking projection 27 of the first tubular part 11 protrudes into the first end part 13 beyond the outer peripheral edge of the first end part 13, and is in contact with the inner peripheral surface of the outer peripheral edge of the first end part 13. Thus, the first tubular part 11 and the first end part 13 are prevented from moving in a direction orthogonal to the axial line A. Similarly, the outer peripheral edge of the second end part 14 abuts against the terminal edge of the first end 17A of the outer peripheral wall 17 of the second tubular part 12 in the axial direction. Each locking projection 27 of the second tubular part 12 protrudes into the second end part 14 beyond the outer peripheral edge of the second end part 14, and is in contact with the inner peripheral surface of the outer peripheral edge of the second end part 14. Thus, the second tubular part 12 and the second end part 14 are prevented from moving in a direction orthogonal to the axial line A.

In the illustrated embodiment, the projecting pieces 28 are used for joining the adjoining tubular parts 11 and 12 to each other, and the locking projections 27 are used for joining each tubular part 11, 12 to the corresponding end part 13, 14. However, it is also possible to use the projecting pieces 28 for joining each tubular part 11, 12 to the corresponding end part 13, 14, and the locking projections 27 for joining the adjoining tubular parts 11 and 12 to each other. Furthermore, it is possible to use a combination of the locking projections 27 and the projecting pieces 28 to join the adjoining tubular parts 11 and 12 to each other or to join each tubular part 11, 12 to the corresponding end part 13, 14.

A second shaft hole 31 is passed centrally through each of the first end part 13 and the second end part 14 along the axial line A. The outer axial end surface of each of the first end part 13 and the second end part 14 surrounding the second shaft hole 31 is formed with a receiving recess 32 configured to snugly receive the fitting 7, 8. Each receiving recess 32 includes a circular central portion 32A and a plurality of radial extensions 32B extending radially outward from the outer edge of the central portion 32A.

The inner axial end surface of each of the first end part 13 and the second end part 14 surrounding the second shaft hole 31 is formed with a tubular boss 34 projecting toward the open end of thereof in the axial direction. The inner peripheral surface of the boss 34 extends continuously with the second shaft hole 31. A plurality of reinforcing ribs 36 extend radially from the outer peripheral surface of the boss 34 on the inner surface of the first end part 13 or the second end part 14, as the case may be.

As shown in FIGS. 3, 4, 9, and 10, the first fitting 7 and the second fitting 8 are each provided with a tubular portion 41 through which the shaft 5 is inserted, and a flange 42 formed at the base end the tubular portion 41. The flange 42 is provided with a plurality of radial projections 43 that protrude radially outward, and are snugly received the corresponding radial extension 32B of the receiving recess 32 so that the fitting 7, 8 is prevented from rotating around the axial line A relative to the mandrel 6. When the flange 42 is received in the receiving recess 32, the first surface 42A of the flange 42 on the outer side continuously smoothly connects with the adjoining surface of the first end part 13 or second end part 14 of the mandrel 6. The first surface 42A is preferably roughened by sandblasting or the like. The surface roughness of the first surface 42A is preferably 10 μm to 15 μm. By suitably selecting the surface roughness of the first surface 42A, the adhesion between the resin matrix and the flange 42 can be maximized.

A plurality of engagement ribs 45 extend in the radial direction on a second surface 42B (end surface) of the flange 42 facing away from the first surface 42A. A plurality of engagement grooves 46 are formed on the bottom surface of the receiving recess 32 so as to receive the engagement ribs 45 in a complementary manner. Each engagement groove 46 extends in the radial direction with respect to the axial line A from the peripheral edge of the second shaft hole 31 to the tip of the radial extension 32B. In the present embodiment, there are four radial projections 43, and each radial projection 43 is provided with the corresponding engagement rib 45 that extends centrally thereof. By engaging the engagement ribs 45 with the respective engagement grooves 46, the rotation of the fitting 7, 8 relative to the corresponding end part 13, 14 is prevented in a secure manner.

The outer circumferential surface of the tubular portion 41 is formed with an annular rib 47. The annular rib 47 protrudes radially outward with respect to the tubular portion 41, and extends in the circumferential direction. The annular rib 47 is spaced from the first surface 42A of the flange 42 by a distance which is preferably smaller than the thickness of the vessel 2 to be molded.

As shown in FIGS. 1 and 2, the shaft 5 is inserted into the first tubular part 11, the second tubular part 12, the first end part 13, the second end part 14, the first fitting 7, and the second fitting 8. The shaft 5 is passed through the tubular portion 41 of the first fitting 7, the second shaft hole 31 of the first end part 13, the first shaft hole 26 of the first tubular part 11, the first shaft hole 26 of the second tubular part 12, the second shaft hole 31 of the second end part 14, and the tubular portion 41 of the second fitting 8, in that order. The first tubular part 11, the second tubular part 12, the first end part 13, the second end part 14, the first fitting 7, and the second fitting 8 are thus supported by the shaft 5 in a coaxial relationship.

Figure 11:
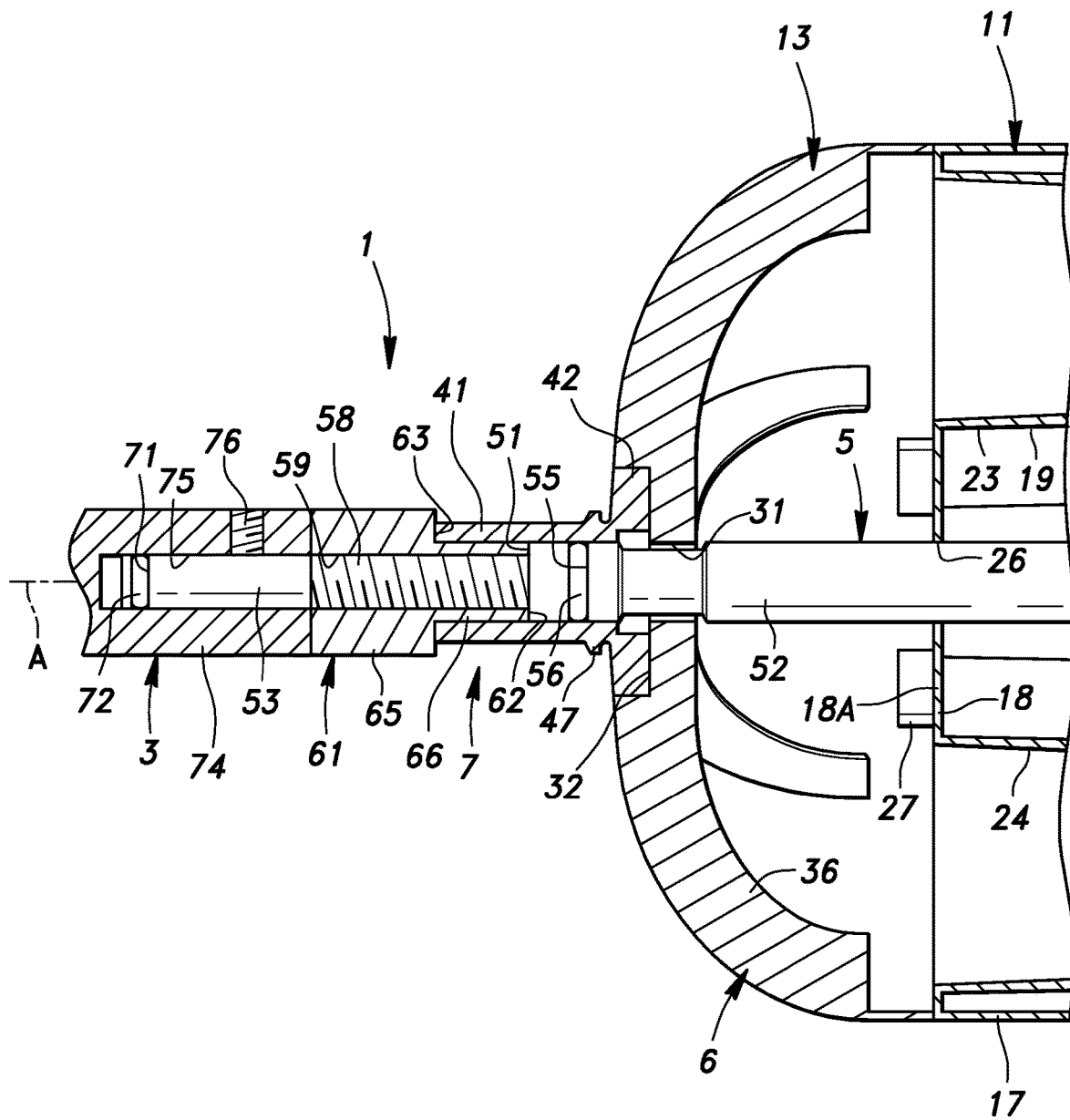
FIG. 11 is an enlarged sectional view of the mandrel structure.

As shown in FIG. 11, the shaft 5 includes a shaft middle part 52 having one end located in the tubular portion 41 of the first fitting 7, and another end located in the tubular portion 41 of the second fitting 8, and a pair of shaft end parts 53 extending coaxially from each end of the shaft middle part 52. The shaft end parts 53 have a smaller diameter than the shaft middle part 52 so that an annular shoulder surface 51 is defined on each end of the shaft middle part 52. The shaft middle part 52 is snugly received in the tubular portions 41 of the first fitting 7 and the second fitting 8. Parts of the shaft middle part 52 located in the tubular portions 41 of the first fitting 7 and the second fitting 8 are each formed with a first O-ring groove 55 extending circumferentially. A first O-ring 56 made of elastomeric material is received in each first O-ring groove 55, and is placed in contact with the inner circumferential surface of the corresponding tubular portion 41.

The free end of one of the shaft end parts 53 protrudes outward from the first fitting 7, and the free end of the other shaft end part 53 protrudes outward from the second fitting 8. A male screw thread 58 is formed on the outer circumferential surface of the base end part of each shaft end part 53. The outer peripheral surface of the free end part of each shaft end part 53 is formed as a smooth cylindrical surface. A positioning nut 61 having a female screw thread 59 is threaded with the male screw thread 58 of each shaft end part 53. Each positioning nut 61 includes a first abutting portion 62 that abuts against or opposes the corresponding annular shoulder surface 51 of the shaft middle part 52, and a second abutting portion 63 that abuts against an outer end of the tubular portion 41 of the corresponding fitting 7, 8. The positioning nut 61 includes a cylindrical nut main body 65 and a cylindrical nut extension 66 projecting coaxially from the nut main body 65. The nut extension 66 has an outer diameter that is smaller than the outer diameter of the nut main body 65, and smaller than the inner diameter of the tubular portion 41. Thereby, the nut extension 66 can extend into the tubular portion 41. The first abutting portion 62 is provided at the free end of the nut extension 66. The second abutting portion 63 is provided on an annular shoulder surface defined at the boundary between the nut main body 65 and the nut extension 66. The female screw thread 59 is formed on the inner circumferential surface of the positioning nut 61, and extends over the entire length of the positioning nut 61.

The positioning nuts 61 are positioned on the shaft 5 owing to the abutting of the second abutting portion 63 against the end surface of the corresponding tubular portion 41. At this time, each first abutting portion 62 may either abut against the corresponding annular shoulder surfaces 51 of the shaft middle part 52 or slightly spaced therefrom. The positioning nuts 61 thus jointly clamp the first fitting 7, the mandrel 6, and the second fitting 8 along the axial line A. As a result, the first fitting 7, the mandrel 6, and the second fitting 8 are properly positioned and secured on the shaft 5.

The free end of each shaft end part 53 protrudes from the corresponding positioning nut 61, and is provided with a second O-ring groove 71 extending circumferentially around the shaft end part 53. A second O-ring 72 made of elastomeric material is received in the second O-ring groove 71.

The drive unit 3 is provided with a pair of support rods 74 each defining a support hole 75 extending in the axial direction, and opening out at the free end thereof. Each support hole 75 snugly receives the free end part of the corresponding shaft end part 53. The free end part of each shaft end part 53 is inserted into the corresponding support hole 75, and the second O-ring 72 fills the gap between the shaft end part 53 and the support hole 75 so that the shaft 5 is accurately centered in the support hole 75. Further, the support rod 74 is provided with a set screw 76 that advances and retreats radially into and out of the support hole 75. The set screw 76 can be thus pressed against the shaft end part 53 from the radial direction to restrict the rotation of the shaft 5 with respect to the support rod 74.

The manufacturing process (manufacturing method) of the mandrel structure 1 is described in the following. The manufacturing process of the mandrel structure 1 includes a step (first step) of inserting the shaft 5 into the hollow mandrel 6 formed by molding a raw material containing pulp and a starch-based binder, a step (second step) of passing the two ends of the shaft 5 protruding from the mandrel 6 through the fittings 7 and 8 and fitting the base ends (the flanges 42) of the fittings 7 and 8 into the respective receiving recesses 32 formed on the outer axial end surfaces of the mandrel 6, and a step (third step) of threading the positioning nuts 61 onto the respective shaft end parts 53 of the shaft 5 so as to clamp the mandrel 6 and the fittings 7 and 8 between the positioning nuts 61.

In the first step, the mandrel 6 is formed by combining the first tubular part 11, the second tubular part 12, the first end part 13, and the second end part 14, and the shaft 5 is passed through the first shaft holes 26 and the second shaft holes 31. The shaft 5 may be inserted into the first tubular part 11, the second tubular part 12, the first end part 13, and the second end part 14 while these portions are separated from each other so that the first tubular part 11, the second tubular part, the first end part 13 and the second end part 14 may be joined together by being slid along the shaft 5.

In the second step, one of the shaft end parts 53 is inserted into the tubular portion 41 of the first fitting 7, and the first fitting 7 is slid along the shaft end part 53 until the flange 42 of the first fitting 7 is snugly received in the receiving recess 32 of the first end part 13. Once the flange 42 is received in the receiving recess 32, the first fitting 7 is prevented from rotating with respect to the first end part 13. Then, the other shaft end part 53 is inserted into the tubular portion 41 of the second fitting 8, and the second fitting 8 is slid along the shaft end part 53 until the flange 42 of the second fitting 8 is similarly received in the receiving recess 32 of the second end part 14 in a rotationally fast manner.

In the third step, the positioning nuts 61 are threaded onto the male screw threads 58 of the respective shaft end parts 53. When the second abutting portions 63 (the annular shoulder surfaces) abut against the end surfaces of the tubular portions 41 of the respective fittings 7 and 8, the positioning nuts 61 are positioned with respect to the shaft 5. In this state, the second abutting portions 63 of the positioning nuts 61 abut against the end parts of the tubular portions 41 of the respective fittings 7 and 8. The positioning nuts 61 thus jointly clamp the mandrel 6 and the fittings 7 and 8 in the axial direction so that the mandrel 6 and the fittings 7 and 8 are fixed to the shaft 5. This completes the manufacturing process of the mandrel structure 1.

Figure 12:
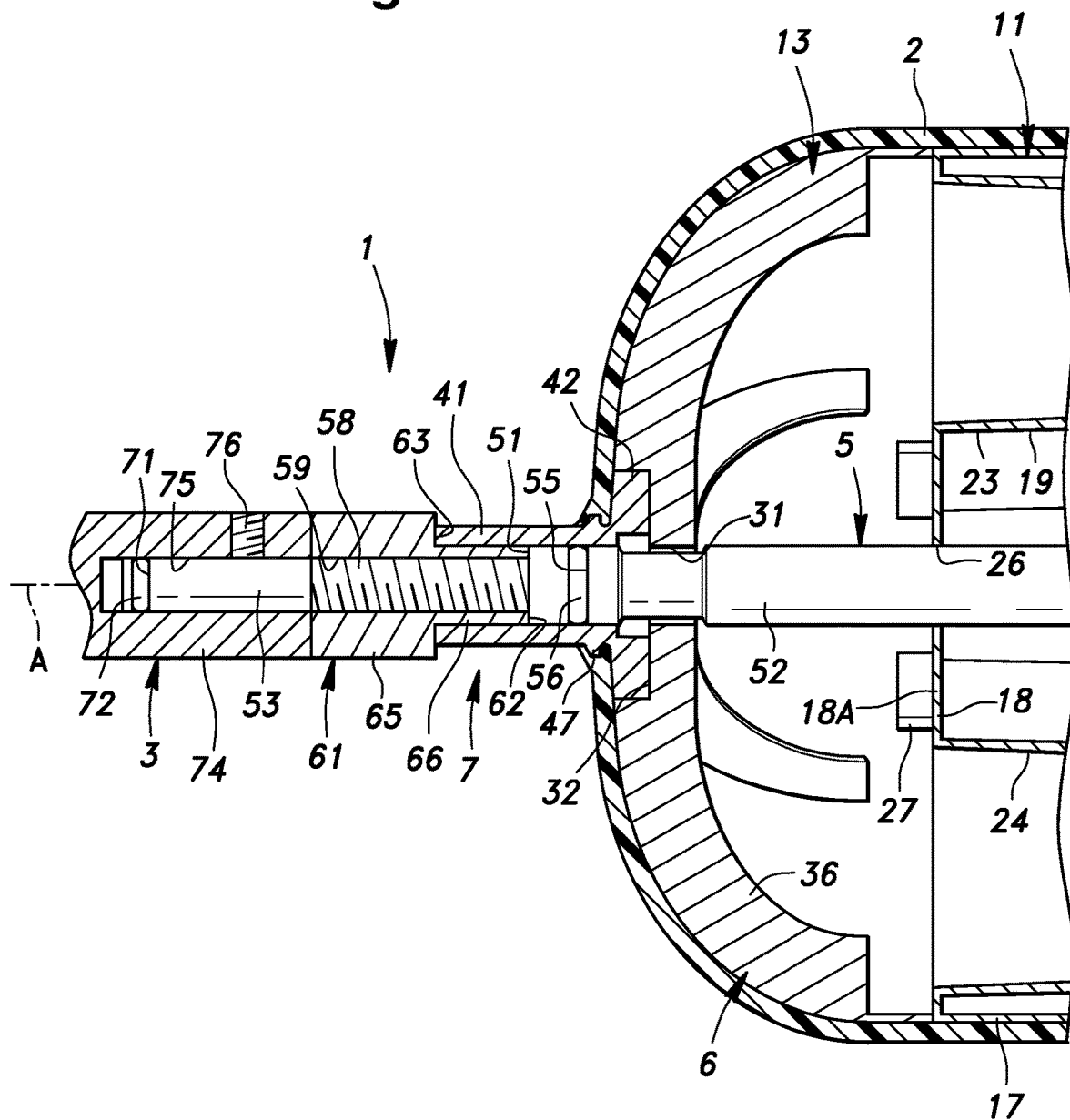
FIG. 12 is an enlarged sectional view similar to FIG. 11 showing a pressure vessel formed on the mandrel structure.

The end parts of the shaft 5 are inserted into the support holes 75 of the respective support rods 74 of the drive unit 3, and fixed to the support rods 74 by tightening the set screws 76. The drive unit 3 then turns the mandrel structure 1 and winds a filament of reinforcing fibers impregnated with a thermosetting resin around the flanges 42 of the fittings 7 and 8 and the mandrel 6. As a result, a fiber reinforced resin vessel 2 is formed on the outer surfaces of the mandrel 6 and the fittings 7 and 8 as shown in FIG. 12. Thereafter, the vessel 2 is thermally processed to cure the thermosetting resin. After the thermosetting resin is cured, the positioning nuts 61 are removed from the shaft 5, and the shaft is pulled out from the mandrel 6 and the fittings 7 and 8. Thereafter, water is injected into the interior of the vessel 2 through the tubular portion 41 of one of the fittings 7 and 8 to dissolve the mandrel 6 with water. The dissolved mandrel is discharged out of the vessel 2 through the tubular portion 41 of one of the fittings 7 and 8 together with water. The vessel 2 is completed through these steps.

In this mandrel structure 1, the receiving recesses 32 are formed in the first end part 13 and the second end part 14 of the mandrel 6 to receive the flanges 42 of the fittings 7 and 8 in a rotationally fast manner so that the fittings 7 and 8 can be positioned with respect to the mandrel 6 in a reliable manner. Even when the vessel 2 has no liner, the fittings 7 and 8 can be accurately positioned with respect to the mandrel 6 in a rotationally fast manner. By providing the projections 43 to the flanges 42 of the fittings 7 and 8, and the radial extensions 32B to the receiving recesses 32 that engage the projections 43 of the flanges 42 at parts that are displaced from the rotational center by a significant distance, the fittings 7 and 8 can be prevented from rotating relative to the mandrel 6 in a reliable manner. Furthermore, the rotation of the fittings 7 and 8 relative to the mandrel 6 can be prevented by the engagement between the engagement ribs 45 provided in the flanges 42 and the engagement grooves 46 formed in the bottom surfaces of the receiving recesses 32.

The annular rib 47 provided in the tubular portion 41 of each fitting 7, 8 firmly engages the cured matrix resin so that the fitting 7, 8 can be firmly secured to the completed vessel 2 with respect to the axial direction.

By threading the positioning nuts 61 onto the shaft 5, the mandrel 6 and the two fittings 7 and 8 can be correctly positioned on the shaft 5. Additionally, the elongation (deformation) of the mandrel 6 in the axial direction can be avoided when the filament of reinforcing fibers impregnated with a thermosetting resin is being wound around the mandrel 6.

The mandrel 6 is formed as a hollow structure by combining the first tubular part 11, the second tubular part 12, the first end part 13 and the second end part 14. Since the mandrel 6 consists of a hollow shell, the surface area of the mandrel 6 per weight is maximized so that the mandrel 6 can be dissolved with water in an efficient manner. Therefore, the efficiency of the manufacturing process can be improved. In addition, the environmental impact can be reduced by forming the mandrel 6 from pulp and a starch-based binder. The partition wall 18 and the bulging parts 19 improve the rigidity of the first tubular part 11 and the second tubular part 12. Since the recesses 24 are formed on the back side of the bulging part 19, the thickness of the bulging part 19 can be reduced so that the contact area with the water can be increased. Thereby, the water solubility of the mandrel 6 can be improved.

The present invention has been described in terms of a specific embodiment, but is not limited by such an embodiment, and can be modified in various ways without departing from the spirit of the present invention. For instance, the number of the tubular parts 11 and 12 for each mandrel 6 may be one or three or more.

The invention claimed is:

1. A mandrel for manufacturing a fiber reinforced resin vessel by a filament winding process, comprising:
   a tubular part; and
   a pair of end parts joined to respective axial ends of the tubular part;
   wherein the tubular part and the end parts are each made of a molded product of a material including pulp and a starch-based binder, and
   the tubular part includes a cylindrical outer peripheral wall having a central axial line, a planar partition wall extending radially inward and orthogonally to the central axial line from a first end of the outer peripheral wall, and a plurality of bulging parts bulging from the partition wall toward a second end of the outer peripheral wall, each bulging part being connected to an inner circumferential surface of the outer peripheral wall.

2. The mandrel according to claim 1, wherein a recess is defined jointly by a back surface of each bulging part and an opposing part of the inner circumferential surface of the outer peripheral wall.

3. The mandrel according to claim 1, wherein a free end of each bulging part includes an end wall extending in parallel with the partition wall and connected to the outer peripheral wall.

4. The mandrel according to claim 1, wherein each bulging part includes a pair of side walls extending radially with respect to the central axial line.

5. The mandrel according to claim 1, wherein a shaft hole is passed through the end parts and the tubular part in a coaxial relationship to receive a shaft that supports the end parts and the tubular part.

6. The mandrel according to claim 5, wherein a part of an outer surface of each end part surrounding the shaft hole is formed with a receiving recess configured to receive a fitting for the vessel.

7. The mandrel according to claim 6, wherein the receiving recess is provided with a plurality of radial extensions configured to receive complementary radial projections of the fitting.

8. The mandrel according to claim 5, wherein each end part is provided with a plurality of reinforcing ribs extending radially from a peripheral part of the shaft hole along an inner surface of the end part.

9. The mandrel according to claim 1, wherein the tubular part includes a plurality of individual tubular part sections that are joined to one another in a coaxial relationship, and each tubular part section is provided with a plurality of locking projections projecting axially from the partition wall beyond a corresponding axial edge of the tubular part section, each locking projection having an outwardly facing surface configured to contact an inner peripheral surface of the adjoining tubular part section or the adjoining end part.

10. The mandrel according to claim 1, wherein the tubular part includes a plurality of individual tubular part sections that are joined to one another in a coaxial relationship, and each tubular part section is provided with a plurality of projecting pieces projecting from an axial end thereof beyond a corresponding axial edge thereof, each projecting piece having an outwardly facing surface configured to contact an inner peripheral surface of the adjoining tubular part section or the adjoining end part.

11. The mandrel according to claim 1, wherein the tubular part and the end parts consist of individual molded products formed by injection molding.

\* \* \* \* \*